United States Patent [19]

Maranzano

[11] Patent Number: 5,207,245
[45] Date of Patent: May 4, 1993

[54] SOLENOID VALVE AND VALVE CALIBRATING METHOD

[75] Inventor: Miguel F. Maranzano, Bristol, Conn.

[73] Assignee: KIP Corporation, Farmington, Conn.

[21] Appl. No.: 738,804

[22] Filed: Jul. 31, 1991

[51] Int. Cl.$^5$ .................. F16K 31/06; F15B 13/044
[52] U.S. Cl. ........................ 137/625.65; 251/129.18; 251/129.21
[58] Field of Search ............ 251/129.18, 129.21, 251/129.15; 137/625.65

[56] References Cited

U.S. PATENT DOCUMENTS

| | | | |
|---|---|---|---|
| 3,651,833 | 3/1972 | Piko | 137/625.65 |
| 4,159,026 | 6/1979 | Williamson | 137/625.65 X |
| 4,509,693 | 4/1985 | Nakai | 251/129.18 |
| 4,932,439 | 6/1990 | McAuliffe, Jr. | 251/129.18 X |
| 5,083,747 | 1/1992 | Schmitt-Matzen | 251/129.21 |

Primary Examiner—Arnold Rosenthal
Attorney, Agent, or Firm—McCormick, Paulding & Huber

[57] ABSTRACT

A solenoid-actuated three-way fluid control valve having a paramagnetic valve body and a ferromagnetic adjustable end stop connected by a ferromagnetic tubular sleeve and forming a housing defining a valve chamber containing an axially elongate generally cylindrical ferromagnetic solenoid plunger supported for axial reciprocal movement between a pair of axially opposed valve seats. The plunger is biased toward seating engagement with an associated one of the seats and is moveable out of seating engagement with the one seat and into seating engagement with the other seat in response to energization of a surrounding solenoid coil. An annular ferromagnetic flux ring disposed adjacent one end of the coil cooperates with a diametrically enlarged portion of the plunger to define a portion of a flux path. The position of the end stop relative to the sleeve is adjusted during manufacture to set the clearance between the valve plunger and the one valve seat thereby enabling accurate valve calibration. A method for calibrating the valve is also disclosed.

16 Claims, 2 Drawing Sheets

SOLENOID VALVE AND VALVE CALIBRATING METHOD

BACKGROUND OF THE INVENTION

This invention relates in general to solenoid valves and deals more specifically with improvements in miniaturized solenoid-actuated fluid control valves particularly adapted for low power operation and a method for calibrating such valves.

In a valve of the type with which the present invention is converned an axially elongate solenoid plunger supported for axial reciprocal rectilinear movement in response to energization of a surrounding solenoid coil controls fluid flow through one or more fluid passageways coaxially aligned with the plunger. In the production of such valves the accumulation of manufacturing tolerances resulting from assembly of the valve parts in axially stacked relation to each other has resulted in problems in maintaining uniform valve operating characteristics. This is particularly true with respect to the production of miniature valves.

It is the general aim of the present invention to provide an improved solenoid-actuated fluid control valve which may be manufactured in quantity with substantially uniform operational characteristics and in which magnetic reluctance is minimized to enable efficient low power operation. It is a further aim of the present invention to provide an improved method for calibrating a valve of the aforedescribed general type.

SUMMARY OF THE INVENTION

The present invention is concerned with improvements in a solenoid operated fluid control valve having means defining a fluid chamber and fluid inlet and outlet passageways communicating with the chamber, a valve seat within the chamber and defining the inner end of an associated one of the fluid passageways, and a solenoid assembly including an axially elongate electromagnetic coil assembly having an axially extending bore and an axially elongate solenoid plunger supported within the chamber for axial reciprocal movement between first and second positions relative to the coil assembly and extending into the bore. The plunger in one of its positions is disposed in seated engagement with the valve seat and provides a closure for the inner end of the associated passageway. A biasing means urges the plunger to and maintains it in one of its positions. The plunger is moveable to the other of its positions in response to energization of the coil. In accordance with the present invention the solenoid plunger includes a radially enlarged portion which has a major radial dimension substantially greater than the radial dimension of the coil assembly bore. Further, and in keeping with the invention, an annular flux plate made from ferromagnetic material is disposed generally adjacent one end of the coil assembly and has another bore for receiving the radially enlarged portion of the solenoid plunger therein.

A method for calibrating the improved valve during manufacture includes the steps of providing regulating means for adjusting the clearance between the solenoid plunger in its unseated position and an associated valve seat. The valve is calibrated by applying minimum power to the coil to unseat the solenoid plunger, passing a test fluid at a predetermined pressure through the valve, monitoring the fluid flow rate through the valve, manipulating the regulating means to attain a desired rate of fluid flow through the valve at said predetermined pressure, and further manipulating the regulating means to attain the minimum clearance between the valve seat and the solenoid plunger in its unseated position which permits the desired flow rate through the valve to be maintained.

DETAILED DESCRIPTION OF PREFERRED EMBODIMENT

Figure 1:
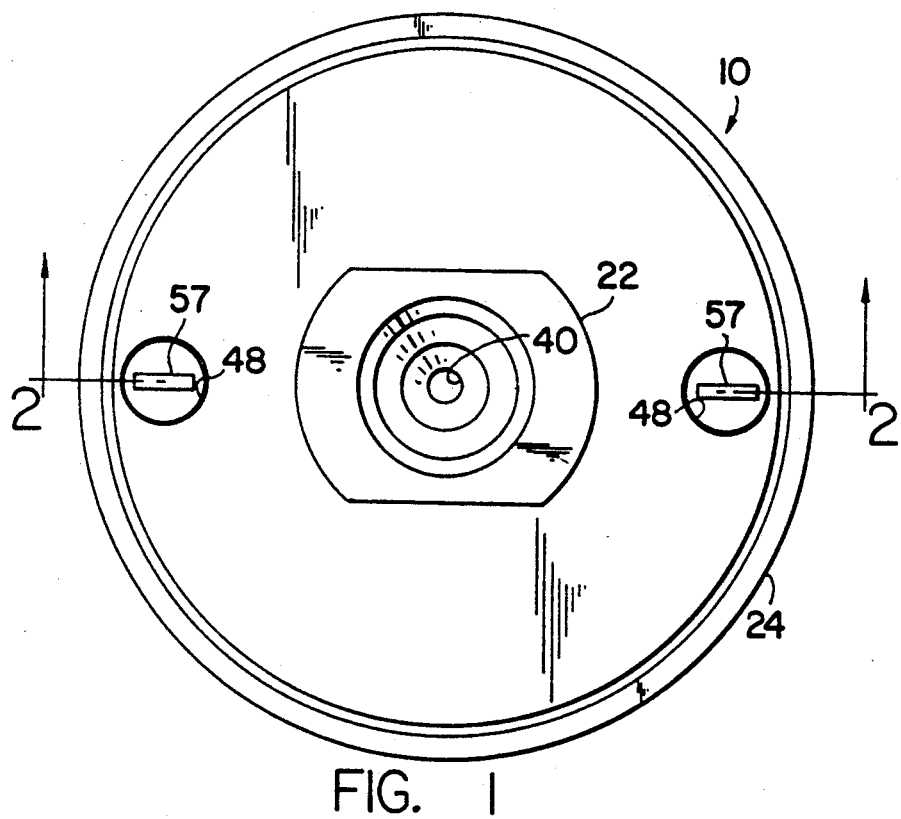
FIG. 1. is a top plan view of a solenoid-actuated fluid control valve embodying the present invention.
Figure 3:
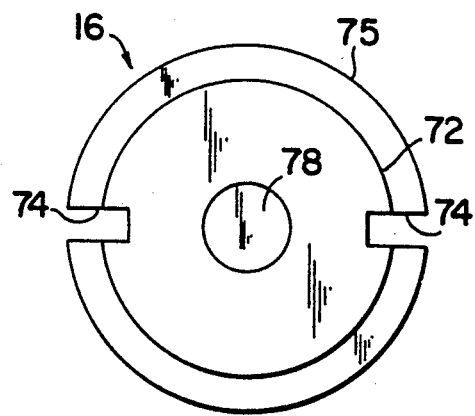
FIG. 3. is a top plan view of the valve plunger.

Turning now to the drawings, the invention is illustrated and described with reference to a miniaturized solenoid-actuated three-way fluid control valve indicated generally by the numeral 10. The illustrated solenoid valve 10 is normally closed and particularly adapted for low power operation in a relatively low pressure fluid flow control application. It has a housing indicated generally by the numeral 12, a coil assembly disposed within the housing and designated generally by the numeral 14 and a solenoid plunger assembly indicated generally at 16.

In accordance with the present invention an annular flux plate 18, made from ferromagnetic material is disposed within the housing generally adjacent and associated end of the coil assembly 14 and cooperates with an enlarged portion of the solenoid plunger assembly 16 to close a part of the magnetic flux path produced by the coil assembly, as will be hereinafter discussed. Further, and in accordance with the invention, a part of the housing assembly 12 is adjustable during manufacture to facilitate calibration of the valve 10.

Considering now the illustrated control valve 10 in further detail and as oriented in the drawing, the housing assembly 12 is generally cylindrical and includes an adjustable end stop 22 and a generally cylindrical tubular sleeve 24 connected to and extending between the valve body 20 and the end stop 22.

The valve body 20 is preferably made from a diamagnetic or paramagnetic material, because the present valve is designed to operate substantially independently of the material from which its body is made. However, the material used to fabricate the valve body must be compatible with the fluid to be controlled by the valve. Material such as stainless steel, brass or DELRIN plastic are presently preferred. As illustrated in the drawing valve body 20 is generally cylindrical and has a generally cylindrical coaxial upwardly open recess 26 coaxially surrounded by a radially disposed and upwardly facing annular seating surface 28. A generally cylindrical valve inlet passageway 30 formed in the valve body opens upwardly through a coaxial valve seat 32 integrally formed on the body and disposed within the recess 26, substantially as shown. A generally cylindrical fluid outlet passageway 34 is also formed in the valve body 20 and communicates with the recess 26 in spaced relation to the valve seat 32, substantially as shown. The outlet passageway 34 has a cross-sectional area substantially greater than the cross-sectional area of the inlet passageway 30.

The sleeve 24 is made from a ferromagnetic material, such as cold rolled steel, and is internally threaded at its opposite ends. The lower end of the sleeve is threaded onto and into seating engagement with the valve body 20 and staked or otherwise secured in fixed position relative to the valve body.

The adjustable end stop 22 provides a closure for the upper end of the valve housing 12, is preferably made from 430FR stainless steel (solenoid grade) and comprises an axially elongate generally cylindrical member having a diametrically enlarged annular flange portion 36 which is threadably engaged in the upper end of the sleeve 24, as will be hereinafter further discussed. The end stop 22 has a radially disposed and downwardly facing abutment surface 38 at its lower end and defines another generally cylindrical fluid passageway 40 which has a cross-sectional area smaller than the cross-sectional area off the passageway 34 and opens downwardly through an integral coaxial valve seat 42. A radially outwardly open annual groove 44 formed in the lower portion of the end stop 22 has an O-ring seal 46 disposed therein. A pair of diametrically opposed apertures 48,48 open upwardly through the flange 36, as best shown in FIGS. 1 and 2, for a purpose which will be hereinafter evident.

Figure 2:
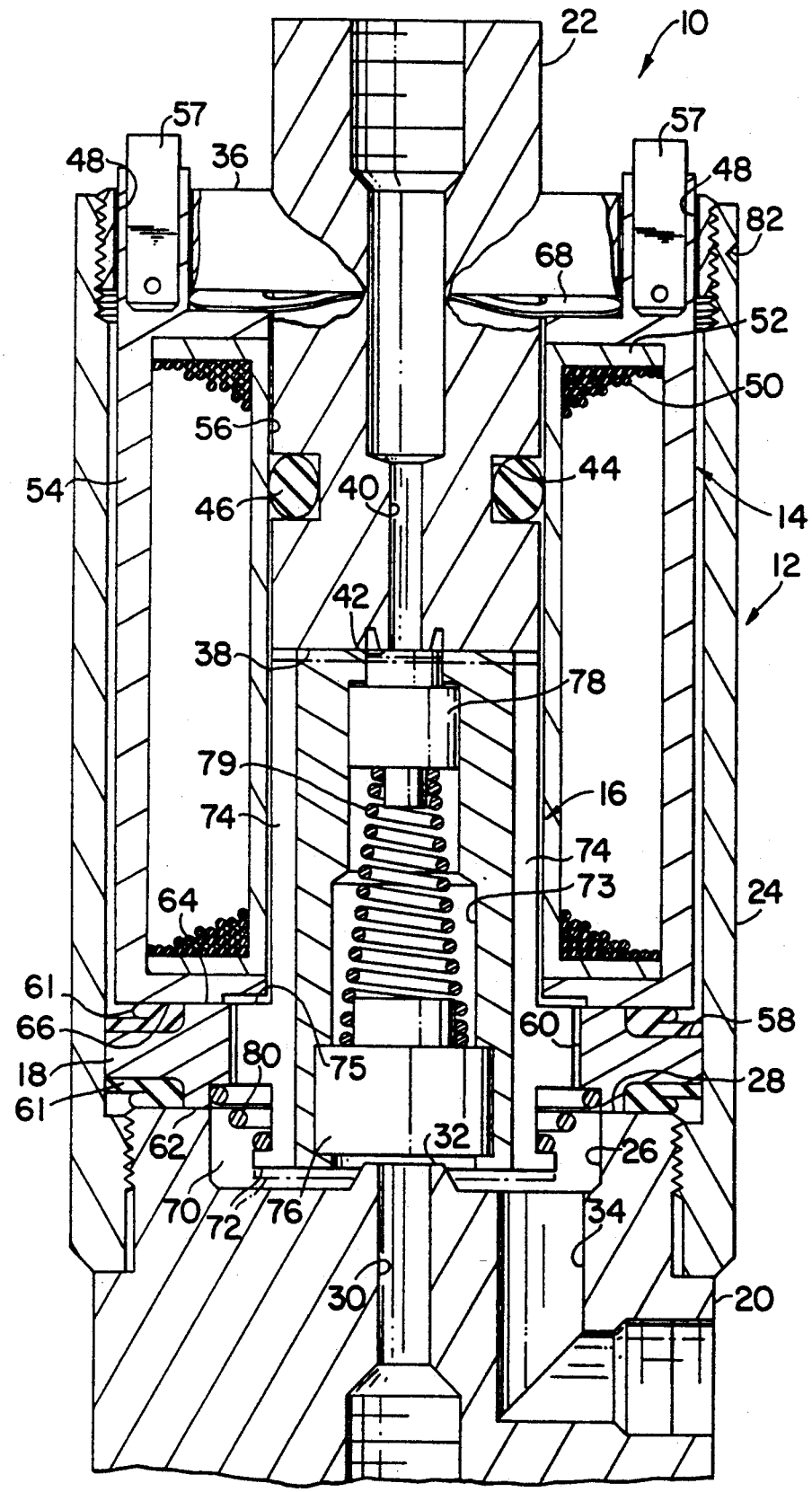
FIG. 2. is a sectional view taken along the line 2—2 of FIG. 1.

The coil assembly 14, best shown in FIG. 2. includes a coil 50 wound on a bobbin 52 and sealed within a cylindrical bobbin casing 54 which has a bore 56 extending coaxially through it and a radially disposed annular bearing surface 66 at its lower end. Electrical terminals 57,57, exposed externally of the bobbin casing 54 for connecting the coil 50 to a suitable source of electrical power extend upwardly and outwardly through the apertures 48,48, substantially as shown.

The flux ring 18 is generally cylindrical, disposed adjacent the lower end of the bobbin casing 54, and has a diametrically enlarged integral annular flange 58, the outside diameter of which is substantially equal to the inside diameter of the housing sleeve 22 in which it is received. A bore 60 extends coaxially through the flux ring 18 and has a diameter substantially larger than the diameter of the casing bore 56. A pair of elastomeric sealing rings 61,61 coaxially surround the flux ring 18 above and below the annular flange 58. Preferably, the sealing rings are molded on and comprise an integral part of the flux ring 18. At its lower end the flux ring has a coaxial radially disposed annular abutment surface 62 for seating engagement on the seating surface 28. A similar annular abutment surface 64 is provided at the upper end of the flux ring for engagement with the annular bearing surface 66 on the lower end of the bobbin casing. A wave washer 68 coaxially surrounds the end stop 22 between the flange 36 and the upper end of the bobbin casing 54 and biases the coil assembly 14 downwardly toward the valve body 20. The wave washer 68 is selected to exert sufficient downwardly directed biasing force upon the coil assembly to compress the elastomeric sealing members 61,61 carried by the flux ring sufficiently to seat the abutment surface 62 on the seating surface 28 and the abutment surface 64 on the bearing surface 66 when the top stop 22 is adjustably positioned relative to the sleeve 24 and the valve body 20, as will be hereinafter further discussed. The O-ring 46 which surrounds a lower end portion of the end stop 22 provides a seal between the surface of the bobbin casing bore 56 and the end stop. Thus, the end stop 22 cooperates with the bobbin casing 54, the flux ring 18 and the valve body 20 to define a valve chamber 70 within the housing assembly 12.

The plunger assembly 16 includes a generally cylindrical plunger 72 which has a coaxial bore 73 extending through it. The plunger is preferably made from 430FR stainless steel (solenoid grade) and supported within the valve chamber 70 for axially reciprocal movement between a first or broken line position and a second or full line position shown in FIG. 2. A pair of elongate slots 74,74 extend along the entire length of the plunger and open radially outwardly through diametrically opposite side of the plunger. At its lower end the plunger 72 has a radially enlarged portion or annular flange 75 which is substantially wholly disposed within the flux ring bore 60 when the plunger assembly in its second or unseated position as shown in FIG. 2. The diameter of the annular flange 75 is substantially greater than the diameter of the casing bore 56 and slightly smaller than the diameter of the flux ring bore 60. A pair of elastomeric seating members 76 and 78 are disposed within the plunger bore, substantially as shown. The lower seating member 76 is retained in fixed position within a diametrically enlarged portion of the plunger bore 73 near the lower end of the plunger. However, the upper seating member 78, located within the upper end portion of the plunger is supported for axial movement within the plunger bore by a conical spring 79 which extends between and acts upon the seating members 76 and 78. A conical plunger spring 80 acts between the flux ring 18 and an annular flange on the lower end of the plunger 72 to bias the plunger downwardly away from the flux ring and towards its first or broken line position of FIG. 2.

When the plunger is in its first position the seating member 76 is disposed in sealing engagement with the valve seat 32 thereby blocking the flow of fluid from the passageway 30 into the chamber 70. The seating member 78 is unseated relative to the valve seat 42 and fluid communication is established between the passageways 40 and 34 by way of the slots 74, 74.

When the coil 50 is energized the plunger assembly 16 moves from its first or broken line position to its second or full line position of FIG. 2., thereby opening the passageway 30 through the valve seat 32 and closing the passageway 40 whereby fluid communication is established between the fluid passageways 30 and 34.

As previously noted, the valve assembly 10 is of a miniaturized type, consequently, the clearance between the valve seat 32 and the seating element 76 may be only a few thousandths of an inch when the valve plunger 72 is in its second or unseated position relative to the valve seat 32. It will now be apparent that, in a valve of this general type, the accumulated manufacturing tolerances between the various stacked parts which comprise the valve assembly may cause a substantial reduction in clearance between the valve element 76 and its associated valve seat 32 resulting in flow restriction when the passageway 30 is open to flow.

In the present valve assembly 10 the aforesaid problem is overcome by the adjustable end stop 22. Since the upper end of the plunger 16 engages the abutment surface 38 at the lower end of the end stop 22 when the plunger is in its open position relative to the inlet passageway 30 the clearance between the valve element 76 and the valve seat surface 32 may be adjusted by threadably rotating the end stop 22 relative to the housing sleeve 24. This adjustment, which is made during manufacture, enables accurate valve calibration to assure production of valves having uniform operational characteristics. Specifically, each valve is calibrated during manufacture to assure that the rated inlet flow condition for the valve will be attained in response to the application of minimal power to the solenoid coil 50.

The valve 10 is initially assembled with clearance between the valve seating element 76 and the valve seat 32 to provide maximum fluid flow through the valve between the inlet passageway 30 and the passageway 34 in response to a predetermined fluid condition when the solenoid assembly is energized. The passageway 30 is connected to a source of test fluid, preferably air under pressure. A predetermined fluid pressure is maintained and monitored while minimal power is applied to the solenoid coil 50 to unseat the plunger 72 and maintain it in its unseated position relative to the seating surface 32. The rate of fluid flow through the valve is also monitored.

The end stop 22 is then rotated relative to the housing sleeve 24 to move the plunger assembly 16 toward the valve seat 32. When a reduction in the rate of fluid flow below the desired rate is observed the direction of rotation of the end stop 22 relative to the housing sleeve 24 is reversed and the end stop 22 is rotated, as necessary, to reestablish the desired flow rate for the valve. When the desired flow rate has been reestablished the end stop 22 is secured in fixed position relative to the housing sleeve 24. In accordance with the presently preferred method of practicing the invention the housing sleeve 24 is staked to the flange 36 at one or more locations about the periphery of the sleeve to complete valve assembly, one such staking location being indicated at 82 in FIG. 2.

The solenoid valve 10 is constructed and arranged to minimize the length of the flux path and the size of the non-working air gap to concentrate the magnetic flux path and reduce magnetic reluctance whereby the power required necessary to operate the valve is minimized. Hence, a flux path is established through the top stop 22, the sleeve 24, the flux ring 18 and the valve plunger 72 and is independent of the valve body 20.

I claim:

1. In a solenoid-actuated fluid control valve having means for defining a valve chamber and a plurality of fluid passageways communicating with the valve chamber, at least one of the passageways terminating at a valve seat within the valve chamber, an axially elongate solenoid plunger supported within the valve chamber for axially reciprocal movement toward and away from the valve seat between first and second positions, the plunger in its first position preventing fluid flow through the one fluid passageway and in its second position permitting fluid flow through the one passageway, biasing means for urging the plunger assembly to and maintaining it in one of its positions, and means for moving the plunger from its one position to the other of its positions and including a solenoid coil defining an axially extending first bore coaxially receiving therein an associated portion of the plunger, the improvement comprising said plunger including a radially enlarged portion having a radial dimension substantially greater than the major radial dimension of said first bore, a flux plate defining an axially extending second bore having a major radial dimension substantially greater than the major radial dimension of said first bore, said second bore receiving at least a part of said radially enlarged portion when said plunger is in said other of its positions, and adjusting means for regulating the distance between said plunger and said valve seat when said plunger is in its second position to calibrate said valve.

2. In a solenoid-actuated fluid control valve as set forth in claim 1 wherein said plunger is generally cylindrical the further improvement wherein said radially enlarged portion comprises an annular flange.

3. In a solenoid-actuated fluid control valve as set forth in claim 2 the further improvement wherein said flux plate comprises an annular flux ring of ferromagnetic material and said second bore comprises a cylindrical bore having a diameter slightly greater than the diameter of said annular flange and coaxially aligned with said first bore.

4. In a solenoid-actuated fluid control valve as set forth in claim 2 the further improvement wherein said housing includes a paramagnetic body and said flux plate is disposed generally adjacent said coil and said body.

5. In a solenoid-actuated fluid control valve as set forth in claim 1 wherein said means for defining said valve chamber and said fluid passageways comprises a housing containing said solenoid coil and said plunger and said adjusting means comprises one part of said housing and connecting means for attaching said one part to another part of said housing.

6. A solenoid-actuated fluid control valve as set forth in claim 5 wherein said plunger is engaged with said one part when said plunge is in its second position.

7. A solenoid-actuated fluid control valve as set forth in claim 5 wherein said connecting means comprises co-engageable threads on said one part and said other part.

8. A solenoid-actuated fluid control valve as set forth in claim 5 wherein said one part forms a closure for one end of said housing.

9. In a solenoid-actuated fluid control valve having a housing including a generally cylindrical tubular sleeve and a valve body connected to one end of said sleeve, the control valve defining a valve chamber and a plurality of fluid passageways communicating with the valve chamber, at least one of the passageways terminating at a valve seat within the chamber, a solenoid assembly including an axially elongate solenoid plunger supported within the valve chamber for reciprocal movement toward and away from the valve seat between seated and unseated positions, the plunger in its seated position preventing fluid flow through the one fluid passageway and in its unseated position permitting fluid flow through the one passageway, biasing means for urging the plunger assembly to and maintaining it in one of its positions, and means for moving the plunger from its one position to the other of its positions and including a solenoid coil and defining a first bore coaxially receiving therein an associated portion of the plunger, the improvement comprising adjusting means for regulating the distance between said valve seat and said plunger in its unseated position to calibrate said valve and including co-engagable threads on the other end of said sleeve opposite said one end and on said end stop.

10. In a solenoid-actuated fluid control valve as set forth in claim 9 the further improvement wherein said plunger is engaged with said one part when said plunger is in its second position.

11. In a solenoid-actuated fluid control valve as set forth in claim 9 the further improvement wherein said one part forms a closure for one end of said housing.

12. In a solenoid-actuated fluid control valve as set forth in claim 9 the further improvement wherein said one part comprises a generally cylindrical tubular sleeve and said control valve includes a valve body connected to one end of said sleeve and defining said one passageway and said valve seat and an end stop defining said one part and said coengagable threads are disposed on the other end of said sleeve opposite said one end and on said end stop for adjustably attaching said end stop to the other end of said sleeve.

13. In a solenoid-actuated fluid control valve as set forth in claim 9 the further improvement wherein said solenoid assembly includes a generally cylindrical solenoid coil assembly coaxially supported within said sleeve between said valve body and said end stop and biasing means disposed between said coil assembly and said end stop for urging said coil assembly in the direction of said valve body.

14. A solenoid-actuated fluid control valve including a housing having a valve chamber therein, said housing including a ferromagnetic axially elongate generally cylindrical tubular sleeve, a paramagnetic valve body connected to one end of said sleeve and defining at least one fluid passage terminating at a coaxial valve seat disposed within said chamber, and a ferromagnetic adjustable end stop threadably connected to the other end of said sleeve for threadably adjustment generally toward and away from said valve body, a solenoid assembly disposed within said housing and including a generally cylindrical coil assembly having a coaxial first cylindrical bore receiving an associated end portion of said end stop therein, said associated end portion defining a radially disposed abutment surface, first sealing means coaxially surrounding said associated end portion within said first bore and disposed in sealing engagement with said associated end portion and said coil assembly, said solenoid assembly including a ferromagnetic axially elongate solenoid plunger coaxially aligned with and partially disposed within said first bore, said solenoid plunger having an integral radially enlarged annular flange thereon, said flange having a radial dimension substantially larger than the radial dimension of said first bore, a ferromagnetic annular flux plate slidably disposed within said sleeve between said coil assembly and said valve body and having a second cylindrical bore having a radial dimension greater than the radial dimension of said first bore and receiving at least an associated part of said annular flange therein, first biasing means for urging said plunger assembly toward a seated position of engagement with said valve seat, said plunger assembly being moveable to an unseated position in spaced relation to said valve seat in response to energization of said coil assembly, second sealing means for sealing said flux ring in engagement with said coil assembly and with said valve body, and second biasing means acting between said end stop and said coil assembly for urging said coil assembly and said flux plate toward said valve body.

15. A solenoid-activated fluid control valve as set forth in claim 14 wherein said adjustable end stop comprises means for regulating the distance between said plunger assembly and said valve seat when said plunger is in said unseated position to calibrate said fluid control valve.

16. A solenoid-actuated fluid control valve including a housing having a valve chamber therein, said housing including a ferromagnetic axially elongate generally cylindrical tubular sleeve, a paramagnetic valve body connected to one end of said sleeve and defining at least one fluid passage terminating at a coaxial valve seat disposed within said chamber, and a ferromagnetic end stop threadably connected to the other end of said sleeve, a solenoid assembly disposed within said housing and including a generally cylindrical coil assembly having a coaxial first cylindrical bore, a ferromagnetic annular flux plate disposed within said sleeve between said coil assembly and said valve body and having a second bore, ferromagnetic axially elongate solenoid plunger having a diametrically annular flange coaxially aligned with and partially disposed within said first bore, said plunger being supported for axial reciprocal movement between seated and unseated positions relative to said valve seat, said flange being substantially disposed within said second bore in one of said positions, said solenoid plunger having an integral radially enlarged annular flange thereon, said flange having a radial dimension substantially larger than the radial dimension of said first bore.

* * * * *